United States Patent Office 3,446,895
Patented May 27, 1969

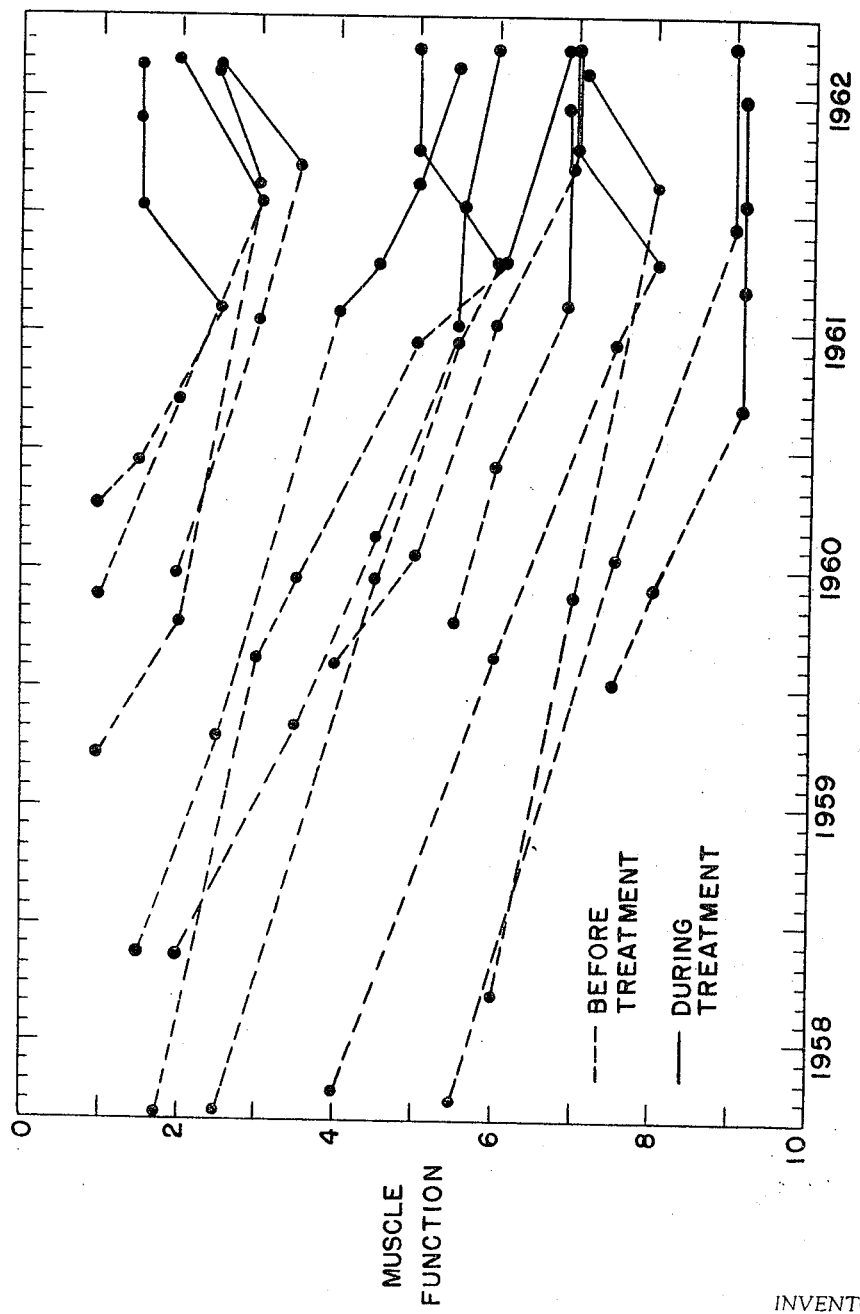

3,446,895
METHODS FOR TREATING MUSCULAR DYSTROPHY WITH A 1-METHYL-Δ¹-ANDROSTEN-17β-OL-3-ONE AND DIGITOXIN
Robert M. Dowben, Cambridge, Mass., assignor to Northwestern University, Evanston, Ill., a corporation of Illinois
Continuation-in-part of application Ser. No. 501,084, Oct. 22, 1965. This application Sept. 6, 1967, Ser. No. 678,468
Int. Cl. A61k 25/00
U.S. Cl. 424—182    5 Claims

ABSTRACT OF THE DISCLOSURE

Method of treating muscular dystrophy in humans by administration of 1-methyl-Δ¹-androsten-17β-ol-3-one or esters thereof in combination with subdigitalizing dosages of digitoxin commencing six weeks after the administration of the steroid.

---

The application is a continuation-in-part of my copending application Ser. No. 501,084, filed Oct. 22, 1965, which is a continuation-in-part of my prior application Ser. No. 288,123, filed June 17, 1963, both of which are now abandoned.

This invention relates to the treatment of muscular dystrophy with a combination of 1-methyl-Δ¹-androsten-17β-ol-3-one or a hydrocarbon carboxylic acid ester thereof and digitoxin. More particularly, this invention relates to the slowing of the progression of the dystrophic process and the increase in muscle strength in patients with muscular dystrophy by the administration of 1-methyl-Δ¹-androsten-17β-ol-3-one or ester thereof by mouth or by intramuscular injection, followed by digitoxin at a dosage level less than that required for full digitalization.

The synthesis of 1-methyl-Δ¹-androsten-17β-ol-3-one is described by Popper and Wiechert, Arzneimittelforschung, vol. 12, pp. 213–214 (1962).

The muscular dystrophies are a group of hereditary diseases characterized by painless, symmetrical, progressive, unremitting weakness and wasting of muscle for which there is no specific treatment. There are several distinct forms, progressive, facioscapulohumeral, limb-girdle and myotonic, which differ in the age of onset, sex distribution, distribution of involved muscles and course of progression.

Thirty-seven patients with muscular dystrophy were treated with a combination of 1-methyl-Δ¹-androsten-17β-ol-3-one or an ester thereof and digitoxin for a period of 5 to 19 months. Most patients had been observed for one year or longer prior to treatment and showed continuous progression of weakness. During the treatment period, an undoubted increase in muscle strength occurred in eight patients (22%) of whom seven had facioscapulohumeral dystrophy, three patients (8%) showed continued deterioration of muscle strength while the remainder, twenty-six patients (70%), were essentially unchanged. Compared to the pretreatment observations, progression of the weakness was slowed. No serious side effects were observed.

Substantiation of benefit from drug treatment in a chronic disease may be difficult unless the signs or symptoms of the disease or a specific laboratory test shows prompt, obvious improvement. A dramatic improvement in muscle strength of dystrophic patients is not expected with any therapeutic agent because more and more muscle is replaced by fat and connective tissue as the disease progresses. Only reversal of the dystrophic defect in still viable but malfunctioning muscle could contribute to increased strength. The evaluation of muscle strength depends on the positioning of the patient and on subjective reactions of the examiner even when mechanical aids such as the strain gauge myometer are used. Furthermore, the examiner may be deluded by better performance as a result of unconscious effort by the patient who hopes that real improvement has, in fact, occurred.

Although there are difficulties in evaluating muscle strength, a real increase in muscle strength was observed in many of the patients after a few months of treatment, particularly in the adults afflicted with facioscapulohumeral dystrophy. A drug would still be valuable therapeutically in muscular dystrophy if it merely slowed the otherwise inexorable progression of weakness. In fact, after 5 to 19 months under treatment, all but 3 of 37 patients were at least as strong as they were at the start of treatment. In untreated patients, further progression of weakness would have been observed during his period.

The subjects were 37 patients judged to have muscular dystrophy on the basis of family history, course of progression and anatomic distribution of weak and wasted muscles, lack of remissions and neurological findings, and pseudohypertrophy, myotonia or atrophy of muscle using diagnostic criteria published previously. The clinical diagnosis was documented by muscle biopsy of the patient or a sibling, electromyography, serum enzyme studies and often tissue culture of muscle. Of the total, ninteen patients suffered from progressive (pseudohypertrophic, childhood) muscular dystrophy, three from limb-girdle muscular dystrophy, eight from facioscapulohumeral muscular dystrophy, and seven from myotonic dystrophy.

1-methyl-Δ¹-androsten-17β-ol-3-one or esters with acids containing 1 to 4 carbon atoms, such as the acetate, propionate or butyrate, can be administered by mouth at a daily dosage of 0.15 to 0.5 mg. of steroid per kg. of body weight. Higher esters of 1-methyl-Δ¹-androsten-17β-ol-3-one with acids containing 5 to 10 carbon atoms, such as the enanthate and phenylacetate, can be administered intramuscularly at dosages of 1.5 to 2.5 mg. per kg. of body weight every two weeks.

The patients were given 0.15–0.5 mg. 1-methyl-Δ¹-androsten-17β-ol-3-one acetate per kg. body weight per os daily, or 1.5–2.5 mg. 1-methyl-Δ¹-androsten-17β-ol-3-one enanthate or phenylacetate in sesame oil per kg. body weight intramuscularly every two weeks. After six to eight weeks, 0.01 mg. digitoxin per kg. body weight per week in divided doses was added to the treatment regimen. This dose is less than that required for full digitalization. The period of treatment and observation ranged from 5 to 19 months. All patients served as their own controls; eighteen patients had been followed for more than one year prior to therapy and twelve patients had been seen for more than two years. The patients had performed vigorous exercises at home for 20 minutes twice daily with the aid of a parent or relative under the guidance of a physical therapist for at least four months before the start of treatment. This vigorous physical therapy was continued during the treatment period.

Muscle strength was evaluated in each patient prior to treatment and at regular intervals thereafter by standard manual muscle testing techniques and with a Newman myometer. In addition, function was rated on a ten grade scale based on performance of activities of daily living using a modification of the eight grade scale of Swinyard et al., Arch. Phys. Med., 38, 574–579 (1957). Routine blood counts, urinalyses, serum aldolase, serum lactic dehydrogenase, bilirubin and sulfobromophthalein retention determinations were obtained prior to treatment and at regular intervals. Two consecutive 24-hour urine collections were obtained after three days on a creatine-free diet prior to treatment and at regular intervals thereafter for determination of creatinine and total creatinine chromogen (creatine + creatinine) excretion.

Beginning the second or third week after the start of treatment, all patients but two experienced a feeling of well-being, increased appetite and increased physical stamina which was sustained during the course of treatment. Twenty-four of the thiry-seven patients felt that they became stronger during the first four months of treatment and that the improvement was sustained. Many patients reported that their extremities were pinker and warmer than before treatment.

An appreciable increase in muscle strength was found in eight patients of whom seven were afflicted with facio-scapulohumeral muscular dystrophy. An increase in muscle strength was observed in seventeen additional patients which was unequivocal. The gains in muscle strength occurred during the first four or five months of treatment and were maintained in all but one of the twenty-five patients. In four patients the circumference of the calves and/or upper arms increased by 1.5 cm. or more during the first four months of treatment.

Muscle function of fourteen patients with progressive muscular dystrophy is depicted in FIGURE 1 before and during treatment on a ten grade scale based on ability to perform activities of daily living. In eleven of these patients a slowing in the rate of progression is seen during the period of medication.

The results of the laboratory determinations were recorded. The 24-hour urinary excretion of creatinine is thought to reflect total muscle mass while the excretion of total creatinine chromogen indicates the total amount of creatine synthesized in the body. In contrast to norethandrolone and other 17-alkylated steroids, a statistically significant increase in total creatinine chromogen was not found, indicating the 1-methyl-$\Delta^1$-androsten-17$\beta$-ol-3-one has little effect on creatine synthesis. While the creatinine excretion in the children with progressive muscular dystrophy did not change significantly on medication, the mean creatinine excretion increased an average of 79 mg./24 hr. in the adults with other forms of muscular dystrophy providing some objective laboratory data pointing to increased muscle mass. The serum aldolase is markedly elevated in patients with progressive muscular dystrophy except in the late stages of the disease. Anabolic steroids also result in small elevations of serum aldolase. Nine of seventeen patients with serum aldolase levels greater than 8.0 v./ml. showed decreases of 1.5 u./ml. or more with treatment. In the twenty patients with serum aldolase levels less than 8.0 u./ml. decreased levels were found in four, increased levels in five, while the aldolase level remained essentially unchanged in eleven patients upon treatment.

Routine blood counts, urinalyses and determinations of serum bilirubin were all within normal limits. The mean sulfobromophthalein retention was 4.3±3.0% before treatment and 5.7±3.6% after treatment, a difference which is not significant statistically. Of the seven patients with myotonic dystrophy, five had basal metabolic rates well in the hypothyroid range. There were no overt manifestations of hypothroidism prior to treatment, but during the course of treatment, two of these patients developed gastrointestinal distress and constipation, dry skin and sleepiness which was relieved by thyroid extract.

Vigorous physical therapy was an essential part of the treatment program. However, the same program of physical therapy in the pre-drug treatment period of observation had little effect on the progression of weakness. The steroids used in these studies do not appear to produce hepatic side effects in this dosage. The androgenic side effects seem to be minimal. During the course of this study, no serious side effects were found.

1-methyl-$\Delta^1$-androsten-17$\beta$-ol-3-one and its esters with acids containing one to ten carbom atoms can be administered per os or intramuscularly. Among the esters which are suitable are the acetate, propionate, butyrate, caproate, enanthate, caprate and phenylacetate. When administered per os the dosage of these compounds is 0.15 to 0.5 mg. per kg. of body weight daily, and when administered intramuscularly the dosage is equivalent to 1.5 to 2.5 mg. per kg. of body weight every two weeks.

I claim:

1. Method of treatment of muscular dystrophy in a human being which comprises administering to said human being the combination of a steroid and digitoxin, said steroid being selected from the group consisting of 1-methyl-$\Delta^1$-androsten-17$\beta$-ol-3-one and esters thereof with hydrocarbon carboxylic acids containing one to ten carbon atoms, the steroid dosage being 0.15 to 0.5 mg. per kg. of body weight per os daily of 1-methyl-$\Delta^1$-androsten-17$\beta$-ol-3-one or its esters of acids containing one to four carbon atoms or 1.5 to 2.5 mg. per kg. of body weight intramuscularly every two weeks of 1-methyl-$\Delta^1$-androsten-17$\beta$-ol-3-one esters of acids containing five to ten carbon atoms and the digitoxin dosage being about 0.01 mg. per kg. of body weight per week, the administration of digitoxin commencing about six weeks after the administration of the steroid.

2. Method of claim 1 wherein the steroid is 1-methyl-$\Delta^1$-androsten-17$\beta$-ol-3-one enanthate.

3. Method of claim 1 wherein the steroid is 1-methyl-$\Delta^1$-androsten-17$\beta$-ol-3-one phenylacetate.

4. Method of claim 1 wherein the steroid is 1-methyl-$\Delta^1$-androsten-17$\beta$-ol-3-one acetate.

5. Method of claim 1 wherein the steroid is 1-methyl-$\Delta^1$-androsten-17$\beta$-ol-3-one.

References Cited

Dowben: New England Journal of Med. (Apr. 25, 1963), pp. 912–916.

Arzneimittelforschung, vol. 12 (March 1962), pp. 213–214.

ALBERT T. MEYERS, *Primary Examiner.*

S. FRIEDMAN, *Assistant Examiner.*

U.S. Cl. X.R.

424—240